United States Patent [19]

Braeger et al.

[11] Patent Number: 5,536,205

[45] Date of Patent: Jul. 16, 1996

[54] DEVICE FOR DETACHING MEAT FROM THE SKELETONS OF FISH

[75] Inventors: Horst Braeger; Wolfgang Möller, both of Lübeck, Germany

[73] Assignee: Nordischer Maschinenbau Rud. Baader GmbH & Co Kg, Lubeck, Germany

[21] Appl. No.: 501,451

[22] Filed: Jul. 12, 1995

[30] Foreign Application Priority Data

Jul. 16, 1994 [EP] European Pat. Off. ............ 941111080

[51] Int. Cl.⁶ .................................................. A22C 25/16
[52] U.S. Cl. ........................................ 452/161; 452/136
[58] Field of Search ................................ 452/161, 135, 452/136

[56] References Cited

U.S. PATENT DOCUMENTS 4,336,634 6/1982 Braeger ........................... 452/135

FOREIGN PATENT DOCUMENTS

| 2946042 | 6/1981 | Germany . | |
|---|---|---|---|
| 0224207 | 7/1985 | Germany | 452/161 |
| 3518960 | 2/1986 | Germany | 452/161 |
| 289540 | 2/1986 | U.S.S.R. | 452/161 |
| 2089642 | 6/1982 | United Kingdom | 452/161 |

*Primary Examiner*—Willis Little
*Attorney, Agent, or Firm*—Fay, Sharpe, Beall, Fagan, Minnich & McKee

[57] ABSTRACT

An apparatus forming part of a filletting machine for removing meat from the skeleton of fish in the region of the ribs is described, through which the fish are conveyed with their tails leading and guided by guides which penetrate into cuts already performed for cutting free the belly and back spokes. The removal of meat from the ribs is performed by means of a tool, which comprises a scraping knife arranged on each side of the belly-cut guides and exending in a plane which forms an angle of between 10° and 50° with the guidance plane defined by the belly-cut and back-cut guides.

17 Claims, 1 Drawing Sheet

DEVICE FOR DETACHING MEAT FROM THE SKELETONS OF FISH

BACKGROUND OF THE INVENTION

1. Field of the Invention

The invention concerns an apparatus for detaching meat from the skeletons of fish, particularly in the region of the ribs, after belly and back cuts have been performed adjacent the belly and back spokes to cut these free, the apparatus comprising conveying means for transporting the fish in a conveying direction, lower and upper guide means defining guiding surfaces and guide edges, the lower and upper guide means being arranged to extend into the belly and back cuts to enclose the belly and back spokes, respectively, and being separated by a first gap which is limited by the guide edges, such that the latter guide the ribs or lateral vertebral appendages at their point of attachment to the vertebral column; a tool for freeing the ribs and comprising scraping knives having pointed ends and counter supports for the scraping knives, the scraping knives being arranged one on each side of the fish path and inclined towards one another with the pointed ends being directed against the conveying direction, and having a cutting edge, the counter supports being arranged to oppose the cutting edges, respectively, and being separated from the cutting edge by a second gap; and controlling means for controlling the scraping knives such that their points are moved out of a position adjacent the lower guide means into a position adjacent the upper guide means shortly before the arrival of the leading end of the fish ventral cavity.

2. Prior Art

Detaching meat using a scraping process, particularly in the region of the ribs, is known and due to the high yield attainable with this process is successfully used mainly in the filletting of middle-sized and large fish. For example a device is disclosed in DE-PS 29 46 042 which has a scraping tool with the above described features at its heart.

In the mechanical processing of fish, it is important, particularly with regard to the economical aspects of processing, that the corresponding processing machines are able to take account of a certain size range within a particular species of fish, or even different fish species with differently shaped belly cavities and lateral bones with the minimum of disruption. This may be achieved with modern imaging and control means, however, in view of the presently existing environmental demands these means are not ideal because of their cost and the problems associated with their maintenance. As a result, there is a tendency to try and achieve an attractive universal solution with simple mechanical means.

However, it has been observed in practice that attempts to follow this principle result in unsatisfactory limitations, particularly with respect to the step of rib scraping, which principally results in individual ribs or fragments thereof remaining in the fillet meat around the end of the belly cavity. This is particularly true when fish are processed which differ from the average size, or exhibit a critical consistency such as thawed frozen goods.

Precise examination has shown that this is caused by the stiffness exhibited by the scraping tool in the known arrangement which is unable to prevent such an error by conforming flexibly to the fish being processed. However, this tool is subjected to high demands which make its robust construction and solid anchorage essential requirements.

Experiments have shown that the frequency of occurrence of the above error is markedly reduced when the scraping blade is arranged to be elastically resilient to a certain extent in a plane lying perpendicular to the plane of symmetry of the fish, i.e. in a plane which in the known arrangement brings about a rigid association.

This requirement results in the scraping blades as described in DE-PS 29 46 042 being controlled to move over the vertebrae to insert their points into the region between the back spokes and the rib bases or vertebral appendages shortly before the arrival of the rear end of the ventral cavity in order to activate the scraping blades. Due to constructional limitations, this was achieved by swinging the scraping tool in a plane lying parallel to the plane of symmetry of the back and belly guides. In the known arrangement, the thickness dimension of the vertebrae of the largest fish to be processed at the position of activation of the scraping blades is decisive for setting the spacing between the points of the scraping blades. It is thus apparent that ideal conditions only exist for fish of a very limited size range so that the frequency of occurrence of the above described errors must increase when fish lying outside this range are processed.

3. Objects of the invention

It is thus an object of the invention to provide an apparatus capable of processing a large range of fish sizes and/or fish species without waste and with uniform quality.

It is a further object of the invention to improve prior art apparatus such that fishes of different sizes and species may be processed successfully without substantially increasing the cost or complexity of the apparatus.

SUMMARY OF THE INVENTION

In an apparatus for detaching meat from the skeletons of fish, particularly in the region of the ribs, after belly and back cuts have been performed adjacent the belly and back spokes to cut these free, the apparatus comprising conveying means for transporting the fish in a conveying direction, lower and upper guide means defining guiding surfaces and guide edges, the lower and upper guide means being arranged to extend into the belly and back cuts to enclose the belly and back spokes, respectively, and being separated by a first gap which is limited by the guide edges, such that the latter guide the ribs or lateral vertebral appendages at their point of attachment to the vertebral column; a tool for freeing the ribs and comprising scraping knives having pointed ends and counter supports for the scraping knives, the scraping knives being arranged one on each side of the fish path and inclined towards one another with the pointed ends being directed against the conveying direction, and having a cutting edge, the counter supports being arranged to oppose the cutting edges, respectively, and being separated from the cutting edge by a second gap; and controlling means for controlling the scraping knives such that their points are moved out of a position adjacent the lower guide means into a position adjacent the upper guide means shortly before the arrival of the leading end of the fish ventral cavity, this and further objects of the invention are achieved by arranging each scraping blade such that, transversely to the conveying direction, it extends in a plane which forms an angle of between 10° to 50° with a plane of guidance defined by the belly and back-cut guides.

With the scraping knives arranged in this way, a certain elasticity in the desired plane is achieved, since the scraping knives no longer lie in this plane but rather are inclined towards it.

On assessing the fillets produced by this method, it is noted that, besides reducing the occurrence of the abovementioned error, a further advantage is obtained in that the quality of cut in the region of the ribs is markedly improved. It should be noted that the flexibility of meat is limited, particularly when it is of critical consistency as is the case for thawed frozen meat. As a result the meat is over-stressed during the conventional scraping process. Such over-stressing is caused by the deformation of the ribs and the meat lying thereon as a result of their being forced into an unnatural position. This brings with it the risk of over-bending and results in the breaking or snapping of individual muscle fibres which manifests itself as a certain roughness on the scraping face. This deficiency is overcome in the arrangement proposed by the present invention since the ribs are scraped while held essentially in their natural position, i.e. the meat experiences practically no bending strain, so that the resulting severed face is perfectly smooth.

Although it has been established that a certain difference between the scraping angle and the angle of the rib bases has no effect on the quality obtained, it is nevertheless advantageous in extreme conditions when the scraping knives are arranged to be adjustable within the given angle range.

In order to prevent the possibility of the ribs being nicked or cut, it is useful when the cutting edge of each scraping knife is bevelled on its inner side.

The start of scraping is ensured safe and without danger to the fillet meat if, according to an advantageous embodiment of the invention, the point of each scraping knife is extended by a guiding nose or projection and/or the end of each counter surface directed counter to the conveying direction is formed to be skid-shaped.

The scraping tool works mainly in the region of the ventral cavity of the fish. In order to limit the area of operation to this region, the scraping knives are operated for a certain time only during the passage of the fish. To this end, the end of each scraping knife is pivotally mounted on a pivot axle, which runs essentially perpendicular to the guide plane defined by the guides for the belly and back spokes, so that the scraping tool can be swung into its active position in a known manner at the moment when the belly cavity of the fish arrives.

BRIEF DESCRIPTION OF THE DRAWINGS

Other and further objects of the present invention will be apparent from the following description and claims and are illustrated in the accompanying drawings which schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

DETAILED DESCRIPTION OF THE PREFERRED EMBODIMENTS

Figure 1:
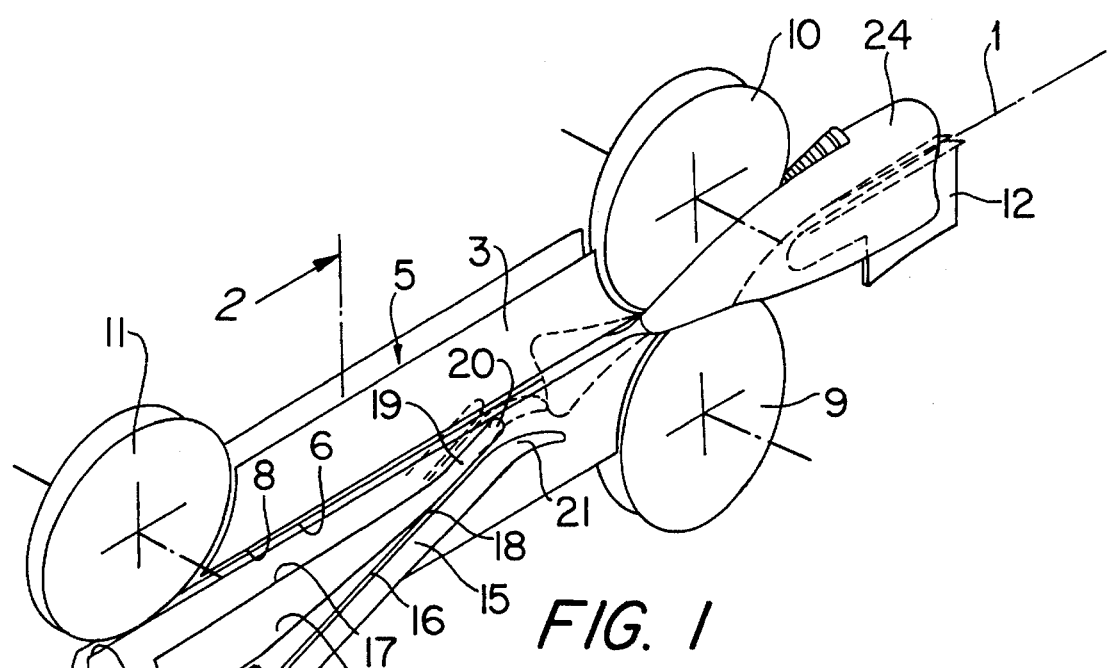
FIG. 1 shows a schematic partial view of a filletting machine equipped with the scraping tool according to the invention in axonometric representation.
Figure 2:
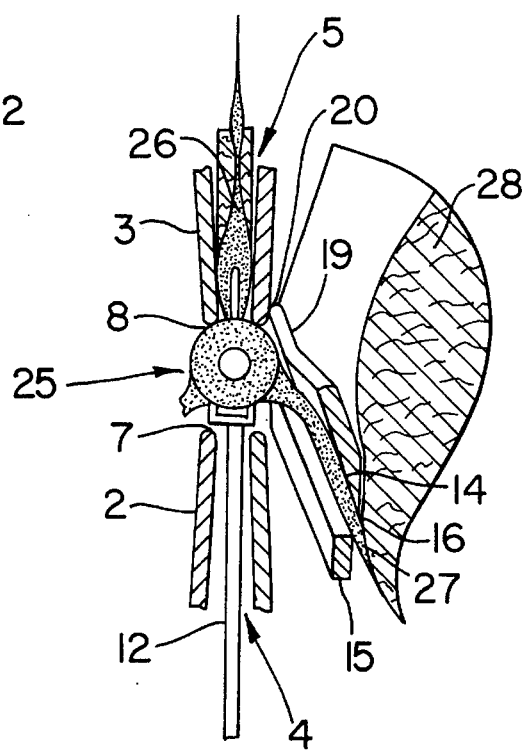
FIG. 2 shows a cross-sectional view of the apparatus through the line II according to of FIG. 1.

A guiding path 1 for fish is formed in a non-shown frame of a filletting machine. The guiding path 1 is defined by pairs of belly-cut guides 2 and back-cut guides 3, which extend above and below the guiding path 1, respectively, and correspond with the plane of symmetry of the fish being conveyed. The guide pairs 2, 3 are separated from one another by a first lateral gap 6, which is limited by the guide edges 7, 8. The guides of each pair are themselves separated by a gaps 4, 5. Pairs of belly filletting knives 9 and back filletting knives 10 are arranged upstream, and in the plane of the guides 2 and 3, respectively, and are preferably offset with regard to the plane of symmetry. A pair of separating knives 11 for finally severing the fish fillets from the skeleton in the region of the tail are arranged adjacent and upstream of the back-cut guides 3. The fish are conveyed by means of thrust saddles 12, which support the fish from within their ventral cavities and convey them along the guide path 1. A tool 13 for performing the rib cuts is arranged between the back filletting knives 10 and the separating knives 11 at the level of the belly-cut guides 2. The tool 13 comprises a pair of scraping devices, each of which is arranged adjacent the belly-cut guides 2 and includes a scraping knife 14 and a counter support 15. The scraping knife 14 has essentially the shape of a right-angled triangle of which the hypotenuse forms the cutting edge 16. The arrangement of the scraping knives 14 with relation to the guide path 1 is such that they are oriented to diverge with respect to the guiding path 1 in the conveying direction while simultaneously being inclined in a roof-shaped manner, i.e. extending away from the path 1 from top to bottom in a vertical direction. When seen by way of a lateral projection with regard to the guiding plane defined by the gaps 4 and 5, the long cathetus 17 runs essentially parallel to the guide edges 7 with the apex of the acute angle formed with the cutting edge 16 running along the hypontenuse directed counter the conveying direction, so that the cutting edge 16 diverges with respect both to the guiding edge 7 and the guiding plane. The counter support 15 is shaped as a rod and can have different cross-sections. It has been found that a counter support 15 with a circular section is particularly easy to use and universally applicable. The counter support 15 is positioned opposite the cutting edge 16 on the outer side of the latter and forms a second gap 18 therewith, which is essentially parallel to the cutting edge 16. A guiding nose 19 is mounted on each scraping blade 14 to extend beyond the apex of the acute angle and extends essentially as an extrapolation of the cutting edge 16 with its front end 20 lying adjacent the outer side of the corresponding belly-cut guide 2. The end 21 of the counter support 15 pointing towards the advancing fish is formed skid-shaped and is likewise arranged adjacent the outer surface of the corresponding belly-cut guide 2.

The tools 13 comprising a scraping knife 14 and a counter support 15 are each pivotally mounted on a pivot axle 22, which is only schematically represented in the figures and which is arranged to extend perpendicular to the guide plane defined by the gaps 4 and 5 between the cut guides 2 and 3 at the end of the tool 13.

The operation of the apparatus is described below. A headed and gutted fish 24, with its ventral cavity opened, is mounted with its ventral cavity on a thrust saddle 12 transported by the conveyor in such a way that its tail end leads in the conveying direction. After being aligned by a not shown alignment means, the fish 24 is guided to the belly filleting 9 and back filleting 10 knives, which cut into the fish 24 starting from the root of the tail on both sides of the belly and back spokes 26, respectively, up to the vertebral column 25. As the fish 24 is advanced further, the belly-cut guides 2 and the back-cut guides 3 penetrate into the corresponding cuts and take over the guidance of the fish 24 by supporting the belly and back spokes, respectively, in the gaps 4 and 5. Throughout this process, the ribs 27 located in the region of the ventral cavity are guided in the lateral gap 6 between the belly-cut guides 2 and the back-cut guides 3. In this manner, the fish 24 is transported to the tool 13 for detaching the fillet 28 from the ribs 27. This tool 13 is initially positioned below the guide edges 7 of the belly-cut guides 2, i.e. it is paused adjacent the guide edges 7, to allow the tail of the fish 24 to pass over it. On the arrival of the end of the ventral cavity, which coincides with the leading end of the thrust saddle 12, the tool 13 is rotated counterclockwise about the pivot axle 22 by means of a suitable not represented cam mechanism which operates sychronously with the saddle conveyor, and the scraping knife 14 and the counter support 15 are thereby raised, so that the scraping knife 14, with the front end 20 of the guiding nose 19 comes to rest adjacent the corresponding back-cut guides 3. At this point, the skid-shaped end 21 of the counter support 15 lies approximately at the level of the guide edges 7 of the belly-cut guides 2. By virtue of this controlled movement, the leading end 20 of the guiding nose 19 penetrates into the meat strip lying on the flanks of the vertebral column 25 which, in the tail area, still attaches the fillets 28 with the skeleton. The guiding nose 19 thus penetrates into the groove area on the vertrebral column 25 between the back spokes 26 and the base of the ribs 27. The front ends 20 are resiliently pushed outwards as they pass the vertebrae of the vertebral column 25 so that the meat strip is severed directly at the flanks of the vertebrae. A the same time, the skid-shaped end 21 of the counter support 15 runs along the underside of the ribs 27 from within the belly cavity, so that the ribs enter into the gap 18 between the counter support 15 and the cutting edge 16 of the scraping knife 14. Due to the divergence of the cutting edges 16 with respect to the conveying direction of the fish 24, the cutting edge then advances on the upper side of the ribs 27 towards the rib ends and the gap 18 functions as a stripping edge, i.e. the meat lying on the ribs is detached therefrom.

The fillets 28 which are still attached to the skeleton in the tail area by meat strips on the flanks of the vertebral column 25 are then cut free by severing these meat strips with the separating knives 11. Fillet conveyors can be arranged adjacent the belly-cut guides 2 onto which the fillets can be transferred lying on their skin for transporting the fillets to a skinning machine, for example.

We claim:

1. An apparatus for detaching meat from the skeletons of fish, said fish comprising at least a vertebral column, to which are attached belly and back spokes, vertebral appendages and ribs which flank a ventral cavity, whereby the fish have been preprocessed such that they include belly and back cuts on each side of the belly and back spokes, respectively, said apparatus comprising:

a) conveying means for advancing the fish in a conveying direction, b) lower and upper guide means defining guiding surfaces and guide edges, said lower and upper guide means being arranged to extend into said belly and back cuts around said belly and back spokes, respectively, and being separated by a first gap, said guide edges being arranged to limit said first gap and guide the ribs or lateral vertebral appendages of the fish adjacent the vertebral column;

c) a tool for freeing the ribs and comprising scraping knives and counter supports for said scraping knives, said scraping knives being arranged one on each side of the advancing fish, whereby each is tapered to a point directed towards the advancing fish and defines a cutting edge, each said counter support being essentially rod-shaped and arranged essentially parallel to a respective cutting edge and being separated from said cutting edge by a second gap; and d) controlling means for controlling said scraping knives such that their points are moved out of a position adjacent said lower guide means into a position adjacent said upper guide means shortly before the arrival of the leading end of the fish ventral cavity, wherein each scraping knife when viewed transverse to said conveying direction extends in a plane which forms an angle of between 10° to 50° with a plane of guidance defined by said belly and back-cut guides.

2. An apparatus as claimed in claim 1, wherein the cutting edge of each scraping knife is arranged to diverge with respect to said guide edges and said guidance plane.

3. An apparatus as claimed in claim 1, wherein the scraping knives are arranged to be adjustable within said angle range.

4. An apparatus as claimed in claim 2, wherein the scraping knives are arranged to be adjustable within said angle range.

5. An apparatus as claimed in claim 1, wherein the point of each scraping knife is extended at its end directed counter the conveying direction by a guiding nose.

6. An apparatus as claimed in claim 2, wherein the point of each scraping knife is extended at its end directed counter the conveying direction by a guiding nose.

7. An apparatus as claimed an claim 3, wherein the point of each scraping knife is extended at its end directed counter the conveying direction by a guiding nose.

8. An apparatus as claimed an claim 1, wherein an end of each counter support directed towards the advancing fish is skid-shaped.

9. An apparatus as claimed an claim 2, wherein an end of each counter support directed towards the advancing fish is skid-shaped.

10. An apparatus as claimed an claim 4, wherein an end of each counter support directed towards the advancing fish is skid-shaped.

11. An apparatus as claimed an claim 1 wherein an end of each counter support directed towards the advancing fish is skid-shaped.

12. An apparatus as claimed an claim 5, wherein an end of each counter support directed towards the advancing fish is skid-shaped.

13. An apparatus as claimed an claim 1, wherein each scraping knife is pivotally mounted on an axis, which is arranged to extend perpendicular to the guidance plane.

14. An apparatus as claimed an claim 2, wherein each scraping knife is pivotally mounted on an axis, which is arranged to extend perpendicular to the guidance plane.

15. An apparatus as claimed in claim 3, wherein each scraping knife is pivotally mounted on an axis, which is arranged to extend perpendicular to the guidance plane.

16. An apparatus as claimed in claim 5, wherein each scraping knife is pivotally mounted on an axis, which is arranged to extend perpendicular to the guidance plane.

17. An apparatus as claimed in claim 8, wherein each scraping knife is pivotally mounted on an axis, which is arranged to extend perpendicular to the guidance plane.

* * * * *